United States Patent [19]

Tominaga

[11] Patent Number: 5,266,190
[45] Date of Patent: Nov. 30, 1993

[54] FILTER APPARATUS FOR USE WITH A WATER TANK

[75] Inventor: Kazutoshi Tominaga, Higashiosakashi, Japan

[73] Assignee: Kabushiki Kaisha Tominaga Jyushi Kogyosho, Osaka, Japan

[21] Appl. No.: 924,173

[22] Filed: Aug. 3, 1992

[30] Foreign Application Priority Data

May 28, 1992 [JP] Japan .................................. 4-137227

[51] Int. Cl.$^5$ ............................................ A01K 63/04
[52] U.S. Cl. .................................. 210/169; 210/416.2; 119/259
[58] Field of Search ................... 210/169, 416.2; 119/5

[56] References Cited

U.S. PATENT DOCUMENTS

| | | | |
|---|---|---|---|
| 3,566,840 | 3/1971 | Willinger | 210/169 |
| 3,635,344 | 1/1972 | Lovitz | 210/169 |
| 5,062,950 | 11/1991 | Shieh | 210/169 |
| 5,078,867 | 1/1992 | Danner | 210/169 |

*Primary Examiner*—Peter Hruskoci
*Assistant Examiner*—Robert James Popovics
*Attorney, Agent, or Firm*—Collard & Roe

[57] ABSTRACT

A filter apparatus comprises a housing 11 accommodating therein a filter unit 19, which unit consists of: a filtering chamber 47 made of a plastics and having an integral flexible pipe 50; and filter elements 48 and 49 received in the filtering chamber. The flexible pipe 50 is connected to an outlet port 30 of a pump unit 14 which has a pendent suction pipe 17 and constitutes the apparatus together with the filter unit. A predetermined pressure of the tank water from the pump unit 14 is applied to the filtering chamber 47 of the filter unit 19 so as to provide a kind of filter press, whereby any dead zones do not take place within the filter elements, thus ensuring the efficient filtration of the tank water, and wherein the filter unit can be replaced easily.

5 Claims, 6 Drawing Sheets

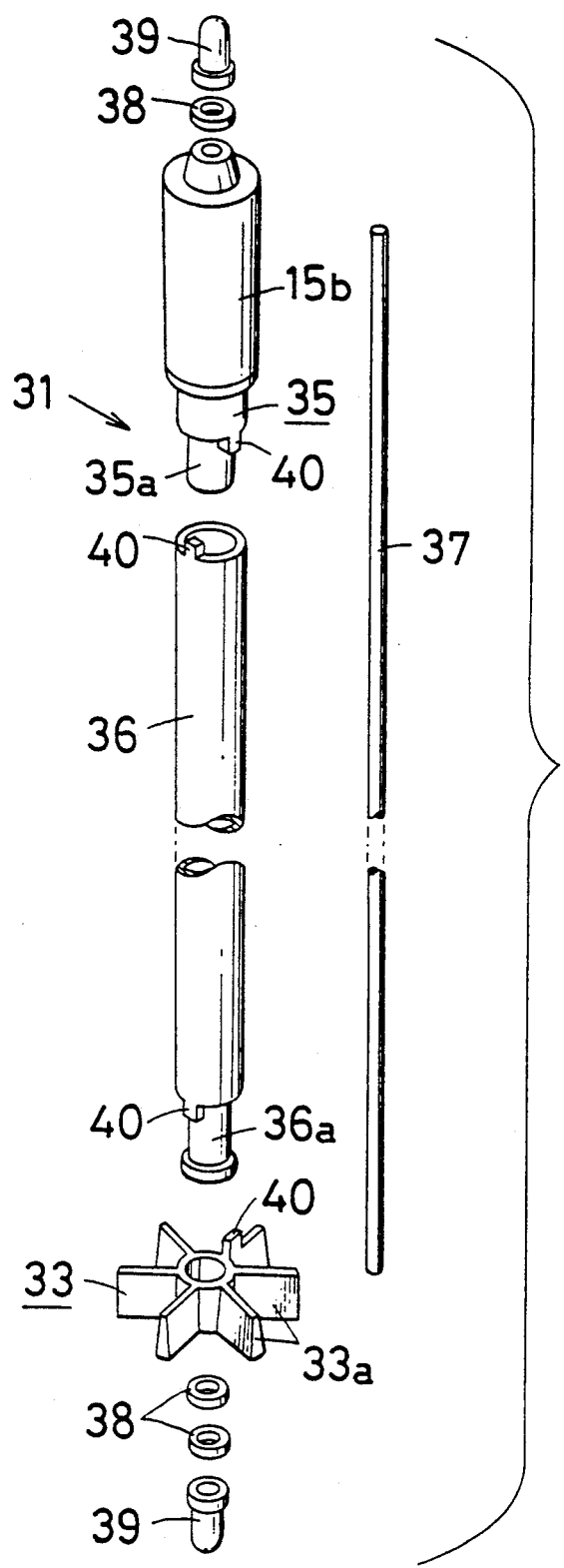
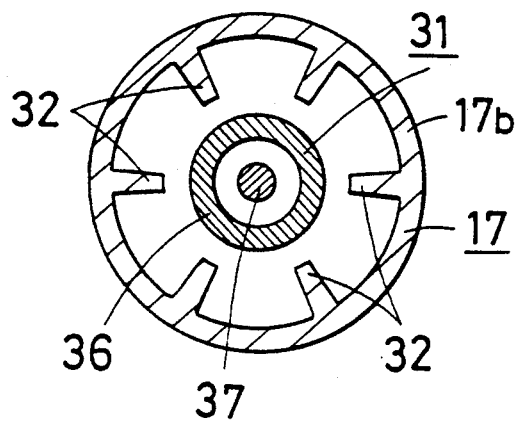
FIG. 7
FIG. 8

FILTER APPARATUS FOR USE WITH A WATER TANK

BACKGROUND OF THE INVENTION

1. Field of the Invention

The present invention relates to a filter apparatus for use with a water tank which may be used to breed aquarium fishes, and more particularly relates to a filter apparatus of a type which can be secured to an upper edge of a water tank and is designed to pump up the water in the tank into a filtering chamber, so that the tank water is filtered by a filter element disposed in the chamber before returning into the water tank.

2. Description of the Prior Art

The prior art filter apparatuses for use with the water tanks for breeding aquarium fishes may be classified into two different groups, according to their positions with respect to the water tanks. In one of the groups, the filter apparatuses are placed under water, while in the other group they are disposed outside the water tank. In the latter case, the filter apparatus may be hung on the water tank wall, or alternatively rest on the upper edge thereof. Those apparatuses for external filtration is advantageous in that they can be employed irrespective of the dimension of water tank. Further, maintenance work such as replacement of filter elements is so easy that the external filtration apparatuses are preferred in this field.

Basically, the filter apparatuses of this type are of such a structure as disclosed in the U.S. Pat. No. 4,512,885. Such an apparatus generally comprises a box-like filtering chamber disposed outside and attached to the water tank peripheral wall, as well as a pump unit for pumping up the water of tank into the filtering chamber, and a filter element which is set transversely of the water passageway formed in the chamber. The filtered water which is cleaned and refreshed by the element will overflow out of the chamber, through a return canal and into the water tank.

It is however noted that the water in the prior art apparatuses is driven through the filter element predominantly by gravitational force imparted to the water itself. Therefore, the water will advance not uniform but locally through the filter element. This tendency becomes more and more remarkable as the dirt and impurities are caught by the element in course of time.

Such a preferential flow of the water through the element portion where flow resistance is lower than the remaining portions will lower the filtering efficiency, thus failing to filter the tank water to a sufficient extent. Durability of the filter element is also impaired, and it must be replaced with a new one in a relatively short time.

SUMMARY OF THE INVENTION

An object of the present invention is therefore to provide for the external filtration system such an improved filter apparatus that its filter element as a whole can operate always more effectively, to thereby ensure a higher efficiency of filtration.

Another object of the invention is to provide a filter apparatus in which the durability of its filter element is improved, and thus which is advantageous from the economical point of view.

Still another object of the invention is to provide a filter apparatus which is designed such that replacement of its filter element can be done easily without soiling the user's hands.

These objects will be achieved by a filter apparatus which is basically of such a structure that the tank water in compressed state is forced through a filter element.

In detail, the filter apparatus provided in the present invention comprises: a housing attachable to a peripheral wall of a water tank and having a return canal for returning the filtered water into the water tank; a pump unit having a suction pipe which extends into and pumps up the water present in the tank; and a filter unit received in the housing, wherein the filter unit comprises: (a) a receptacle which is a blow-molded soft plastics sheet and has an open bottom and a flexible pipe integral with a top of the receptacle; (b) a bottom cover fitted in the open bottom of the receptacle so as to form a filtering chamber and having a plurality of drainage apertures; and (c) filter elements disposed in the filtering chamber, and wherein a free end of the flexible pipe is connected to an outlet port of the pump unit.

In the preferred embodiments, the housing comprising peripheral side walls has a hook portion formed at an upper end of one of the side walls. This hook portion is engageable with the top end of the water tank wall so as to hold the housing in position.

It is also desirable that the flexible pipe of the filter unit is a bellows which will not be depressed flat even if bent in use.

The bottom cover of the filter unit may preferably comprise one or more legs extending from its bottom so that this unit can rest on the water tank bottom, with a free space being provided between them, allowing the filtered water to leave the unit smoothly.

In operation, the tank water pumped up by the pump unit will be delivered to the receptacle enclosing the filtering chamber through the flexible pipe. Therefore, a certain internal pressure is produced within the receptacle, due to the delivery pressure of the pump unit. The internal pressure in said receptacle is effective to cause the tank water to be spread uniform all over the top surface of the uppermost filter element. The tank water will flow uniform through the elements, so that all the portions thereof can operate effectively. The thus filtered water which is clean and refreshed will leave the receptacle through its bottom drainage apertures so as to fill the housing, before overflowing therefrom through the return canal into the water tank.

BRIEF DESCRIPTION OF THE DRAWINGS

The preferred embodiments of the invention are shown in the accompanying drawings, in which:

FIG. 7 is a perspective view showing a drive shaft in its disassembled state, the drive shaft being included in a pump unit of the filter apparatus; and FIG. 8 is a cross section taken along the line 8—8 in FIG. 5.

THE PREFERRED EMBODIMENTS

Figure 1:
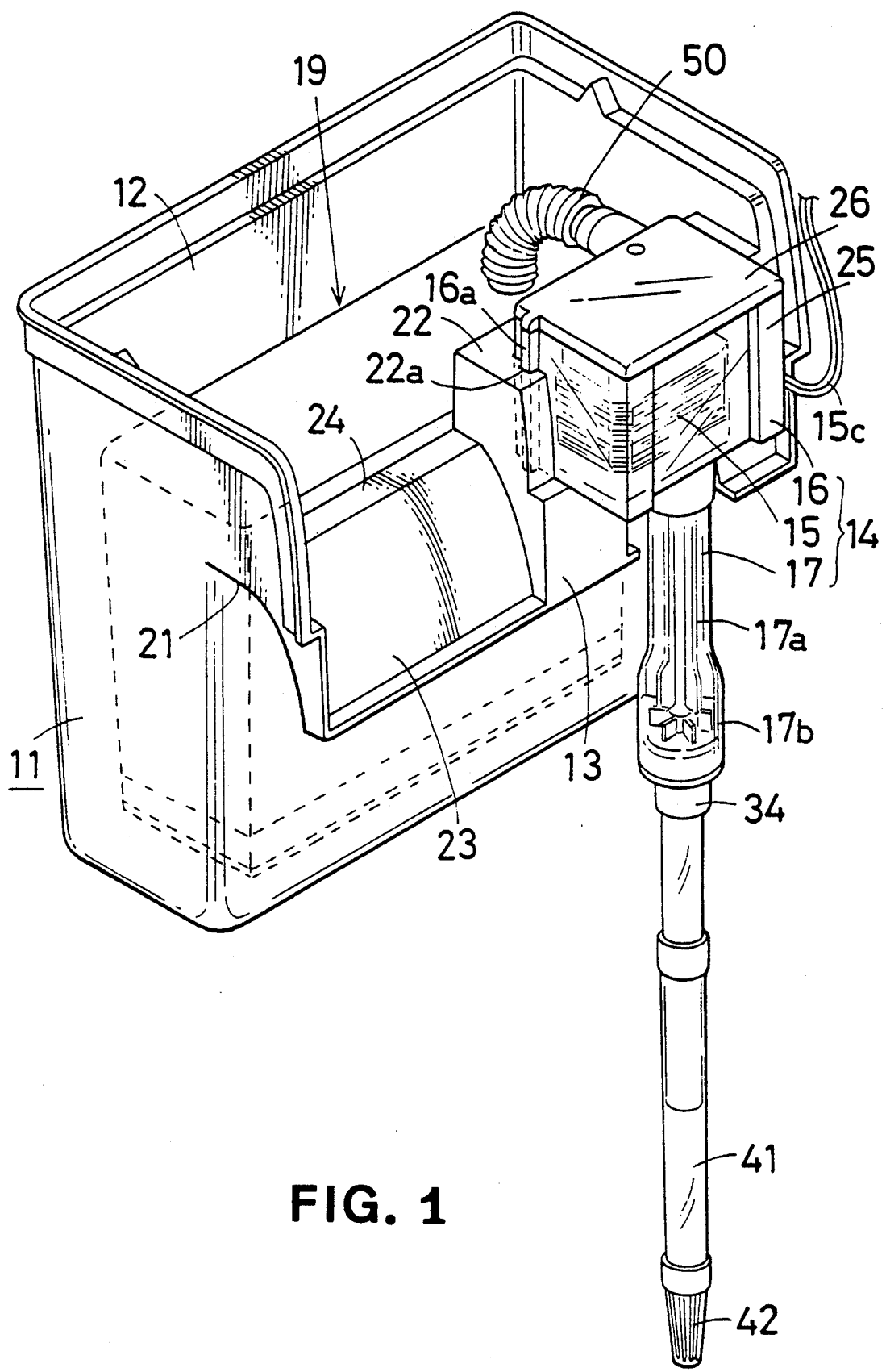
FIG. 1 is a perspective view showing a filter apparatus, with its top cover being removed.

An embodiment of the invention will now be described in detail referring to the drawings.

A filter apparatus in the embodiment comprises a housing 11 of a given size, a pump unit 14 for pumping up the water in a water tank 20, and a filter unit 19 accommodated in the housing 11 and receiving the water from the pump unit 14.

The housing 11 comprises a rectangular container 12 made of a plastics and having an open top. The container has a front wall and an extension 13 integrally protruding from a top end of the front wall. A hook portion 21 of a hook-like shape in side view is defined between the extension 13 and the front wall of the container 12. An upper surface of the extension provides an adapter 22 U-shaped in plan view, for receiving the pump unit. The extension also defines a return canal 23 which is curved and slanted downward and forwardly from the front wall, so that the filtered water flows through the return canal into the water tank. The adapter 22 receiving the pump unit comprises a pair of vertical grooves 22a on its sides and a stepped support 22b (see FIG. 5) on its bottom. A casing 16 of the pump unit 14 has on its sides a pair of elongate lugs 16a which are slidably fitted in the vertical grooves 22a until the bottom of the casing rests on the support 22b. An upper edge of the housing 11 includes a recessed region at a position corresponding to the return canal, with the recessed region serving as an overflow weir 24 which keeps constant the level of tank water. A top cover 18 closes the open top of the container 12 of the housing 11 including its extension 13.

The pump unit 14 is composed of a drive mechanism 15 accommodated in the rectangular casing 16, and a pendent suction pipe 17 extending downwards therefrom. The casing 16 comprises a box-like member 25 made of a transparent plastics, as well as a lid 26 which is made of an opaque plastics and is fastened to the box-like member by means of a bolt 27. A vertical cylinder 28 in this box-like member 25 has an open bottom, and is surrounded by a coiled electric wire, i.e., a core 15a disposed in the casing 16 and constituting the drive mechanism 15. A cylindrical connector 25a which extends from the bottom of the casing 16 is coaxial with the vertical cylinder 28. The top end of the suction pipe 17 is fitted in the cylindrical connector 25a, also extending downwards and coaxially therewith. Further, a feed canal 29 of a reversed L-shape (see FIG. 6) is formed within the casing 16 and adjacent to the vertical cylinder 28 and the connector 25a. The feed canal 29 comprises a vertical portion 29a and a horizontal portion 29b, and the former portion has a communicating aperture 28a with an upper slit and a lower circular cutout, through which aperture 28a this feed canal 29 is in fluid communication with the vertical cylinder 28 and the connector 25a. On the other hand, the horizontal portion 29b of the feed canal is liquid-tightly connected to an outlet port 30 which extends outwardly of the casing 16.

Disposed in an integral inner space defined with the vertical cylinder 28 and the suction pipe 17 is a drive shaft 31 which extends coaxially with said space and has a cylindrical permanent magnet 15b secured to the upper end of said shaft 31. This magnet 15b and the core 15a cooperate with one another and constitute a motor of the drive mechanism 15. The reference numeral 15c denotes an electric wire leading to the drive mechanism from a power source therefor, and the numeral 28b denotes a bearing fitted in the top region of the vertical cylinder 28.

A small-diameter portion 17a and a flared portion 17b of a larger diameter constitute the suction pipe 17 formed of a transparent plastics. Six flow-straightening vanes 32 protrude longitudinally of the suction pipe and centripetally from the inner peripheries of the small-diameter portion 17a and the upper region of the flared portion 17b. Each vane 32 stands still but extends along the full length of the small-diameter portion 17a, and those vanes 32 are arranged at regular intervals around the axis of said pipe 17. The small-diameter portion 17a itself slightly increases its diameter towards its bottom. Disposed in the flared portion 17b and adjacent to the lower ends of the straightening vanes 32 is an impeller 33 which comprises centrifugal vanes or blades made of a plastics and attached to the drive shaft 31. A joint pipe 34 made of a plastics engages fixedly with the lower end of the suction pipe 17. This joint pipe 34 is formed with water inlets 34b which are arranged around a central portion 34a which supports another bearing for the drive shaft 31. A foot pipe 41 is slidably inserted in the joint pipe 34, in a telescopic manner. A strainer 42, which is attached to the lower end of the foot pipe 41, will rest on the bottom of the water tank.

An upper cylindrical shaft 35, a lower cylindrical shaft 36 and a thin metal rod 37 penetrating these cylindrical shafts are the members which constitute the drive shaft 31, wherein the magnet 15b is carried by the upper shaft 35, and the lower shaft 36 operatively fits on the lower constricted end 35a of the upper shaft. Plastics caps 39 are attached to an upper and lower ends of the thin metal rod 37, with slide rings 38 each disposed close to and inside the upper and lower ends. The impeller 33 is fitted on and carried by a lower constricted end of the lower cylindrical shaft 36. Keys 40 protrude from the mating ends of the upper and lower shafts 35 and 36, and also from the mating ends of the lower shaft 36 and the impeller 33, for operative connection of them. Blades 33a of the impeller 33 are designed such that their thickness gradually decreases towards their upper ends. The thus formed tapered surfaces of each blade 33a are effective to increase the suction flow rate of the tank water.

Figure 2:
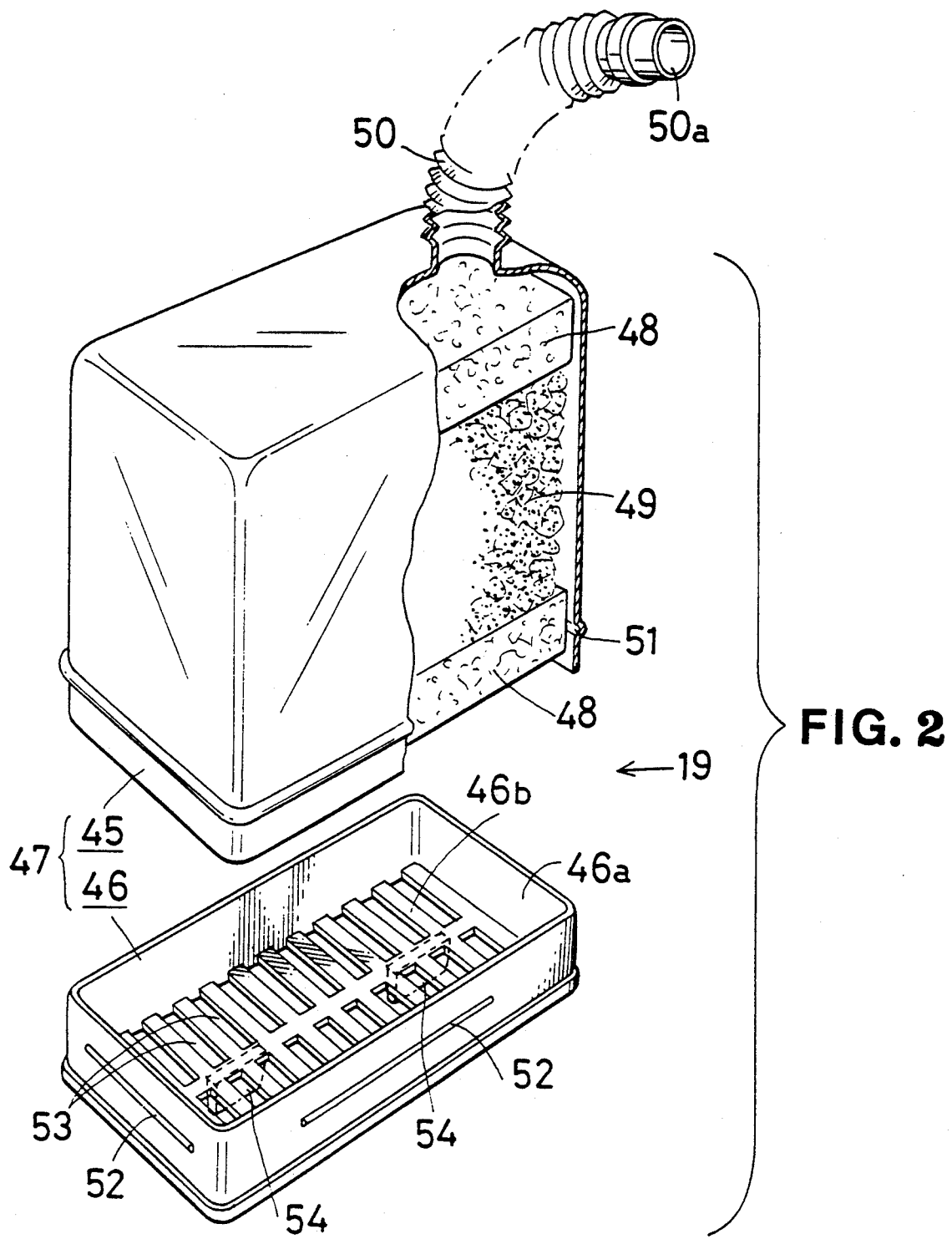
FIG. 2 is also a perspective view showing a filter unit of the filter apparatus, with its portion being cut off in part and with its bottom cover being disassembled.
Figure 3:
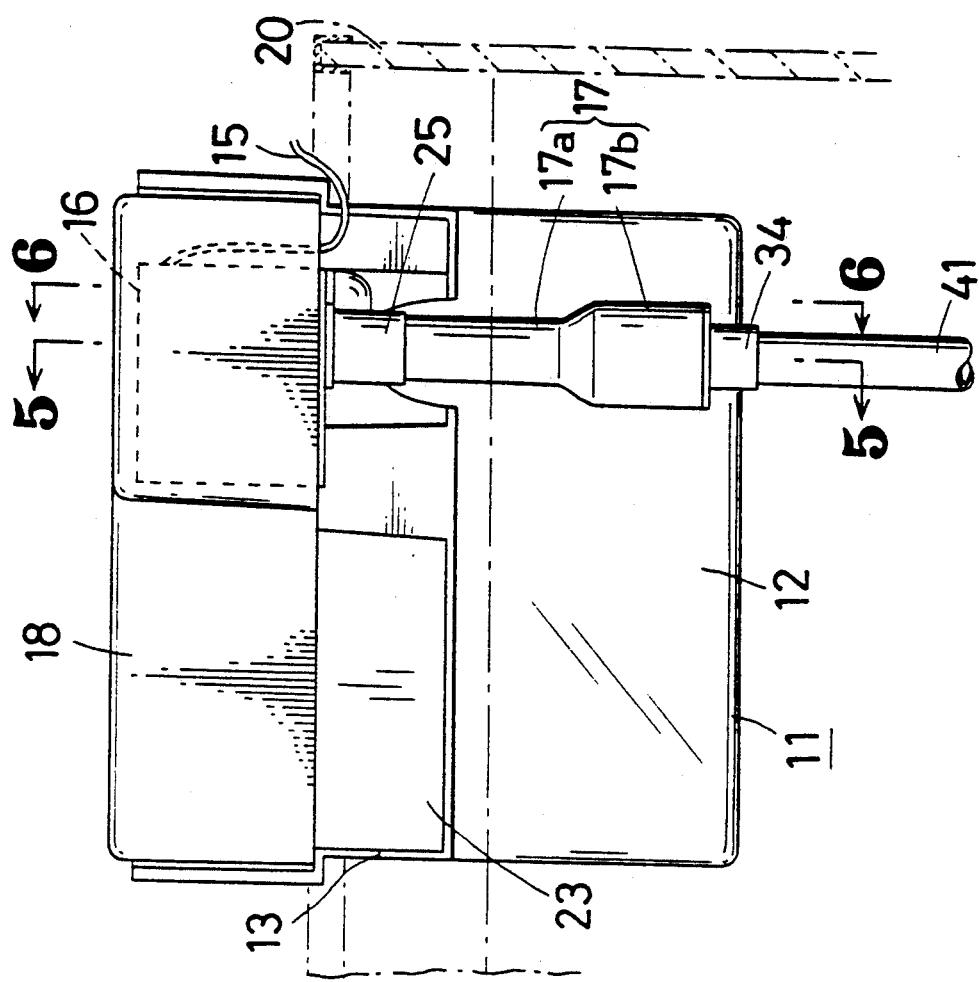
FIG. 3 is a front elevation showing the filter apparatus in its entirety.
Figure 4:
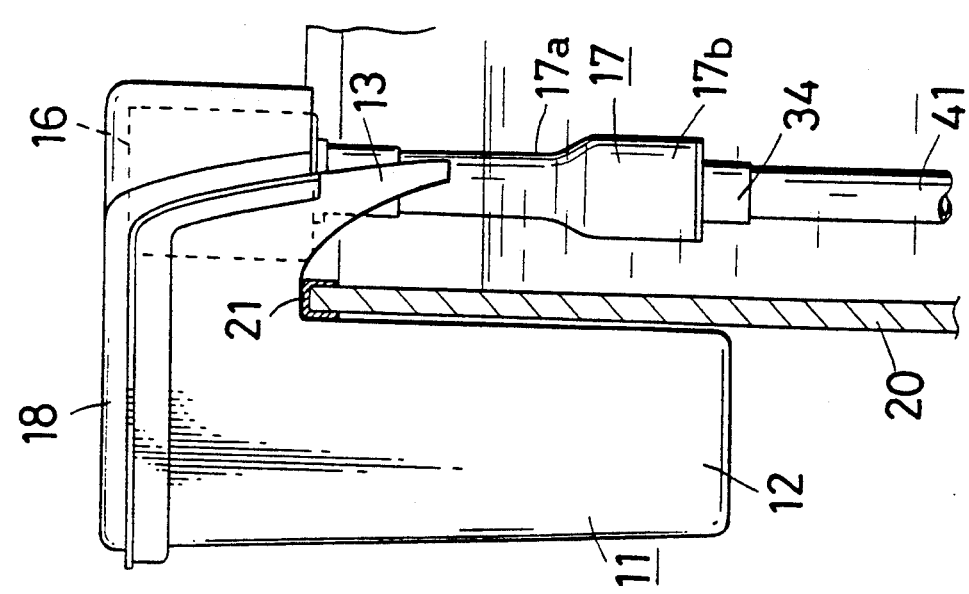
FIG. 4 is a side elevation showing the filter apparatus in its entirety.
Figure 5:
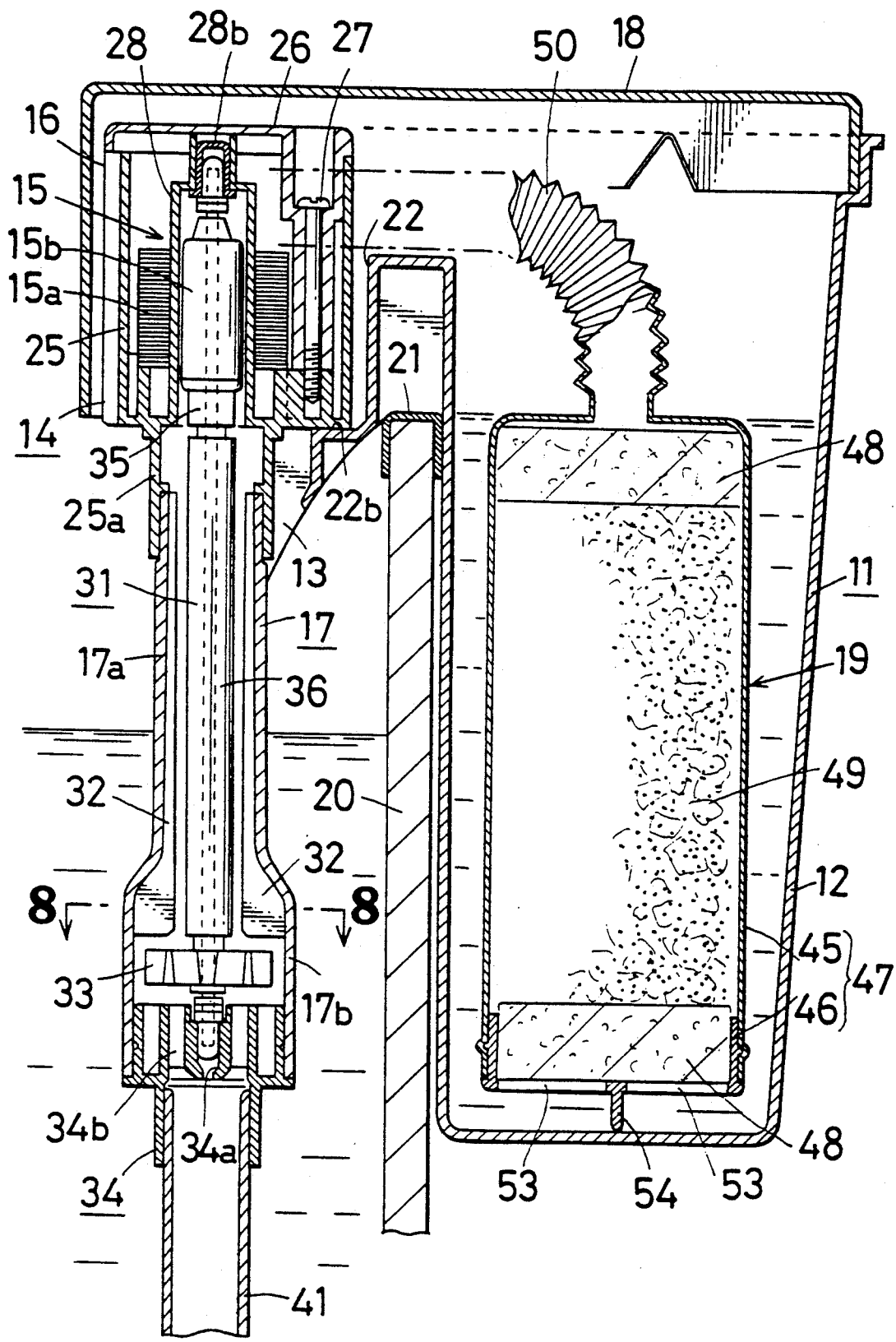
FIG. 5 is a cross section taken along the line 5—5 in FIG. 3.

The filter unit 19 comprises, as seen in FIGS. 2 and 5, a filtering chamber 47 of a substantially cubic shape and filter elements 48, 48 and 49 of different kinds accommodated in the filtering chamber. A receptacle 45 made of a soft plastics by the blow-molding process has an open bottom, in which a bottom cover 46 is tightly secured so as to build the filtering chamber.

Figure 6:
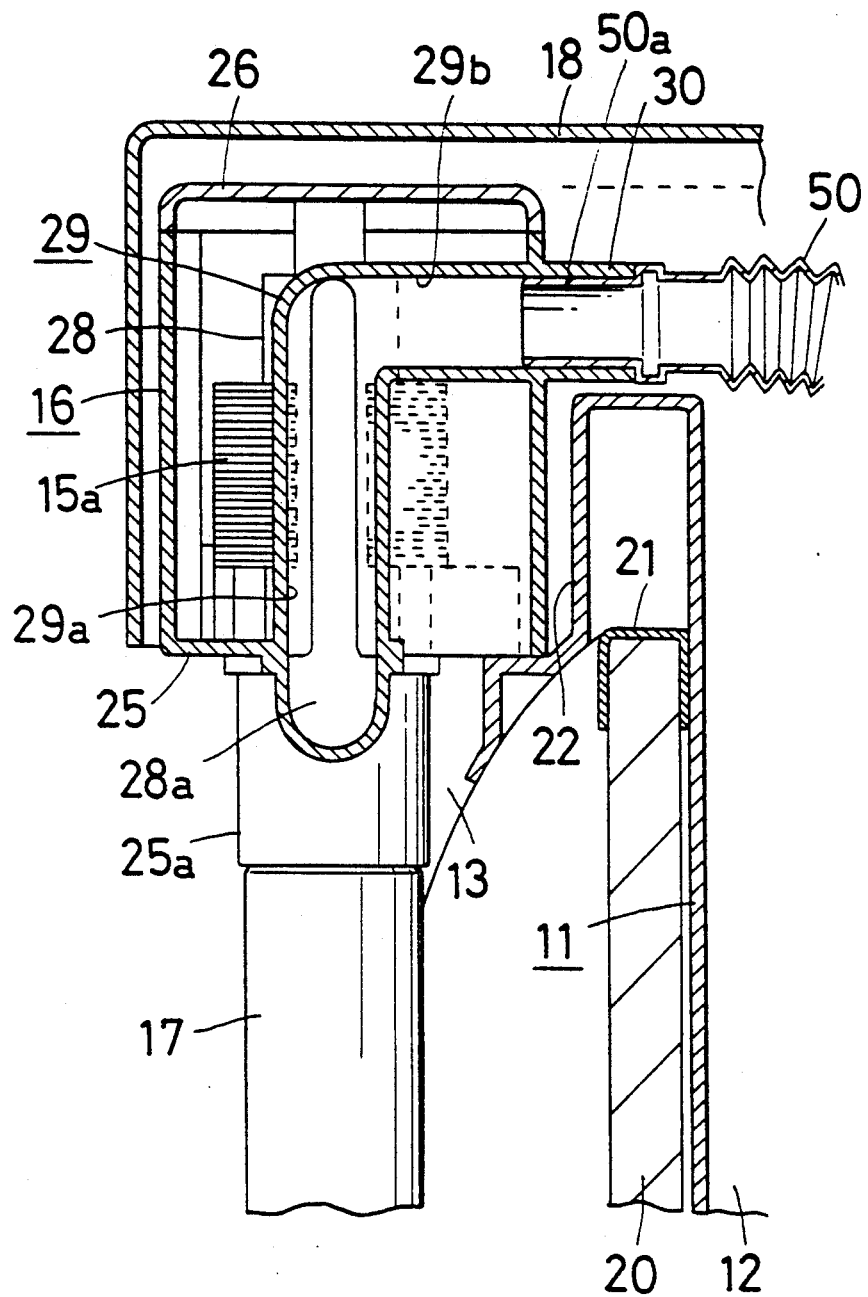
FIG. 6 is another cross section taken along the line 6—6 in FIG. 3.

A flexible pipe 50, which is a bellows, is integral with the receptacle 45 and protrude upwards from a portion of the upper surface thereof. A free end 50a of the flexible pipe 50 is, as shown in FIG. 6, joined with the outlet port 30 of the pump unit 14.

The bottom cover 46 is made of a rigid or semi-rigid plastics to be of a dish-like shape. Its upright peripheral wall 46a is inserted into the lower end of the receptacle peripheral wall. Unintentional removal of the bottom cover is prevented by the engagement of an elongate groove 51 with elongate lugs 52. A bottom plate 46b of the bottom cover 46 is formed with a plurality of drainage apertures 53. Protruding from the lower surfaces of the bottom plate are two legs 54 which are small platelike pieces, as shown in FIGS. 2 and 5. With the filter unit 19 placed in the housing 11, a free space of a height corresponding to the legs 54 is given between the bottom of filtering chamber 47 and the bottom of the housing 11. Such a free space will diminish the flow resistance against the filtered water flowing out of the filtering chamber bottom into the housing 11.

A pair of the upper and lower filter elements 48 are plates of an open-cell foam. The further filter element 49 sandwiched between those elements 48 is, on the other hand, a flocculent or granular aggregation of activated carbon. The upper and lower elements 48 will prevent the middle element 49 from escaping the filtering chamber 47.

In operation of this filter apparatus, the housing 11 is hung on the upper edge of the water tank 20 in such a manner that the hook portion 21 rides the upper edge, thereby submerging the strainer 42 and the foot pipe 41 so deep in the water tank that the joint pipe 34 at the lower end of the suction pipe 17 is also placed sufficiently deep under the water. In this state, the water rises through the water inlets 34b into the flared portion 17b, whereby the impeller 33 is also immersed in the rising water, and the level thereof and the level in the water tank will be equalized. Then, the drive mechanism 15 will be activated by the user in order to rotate the drive shaft 31 and the impeller 33 integral therewith. Consequently, the water in the tank 20 will be pumped up by the impeller 33 so as to flow successively through the suction pipe 17, the feed canal 29, the outlet port 30 and the flexible pipe 50, into the filtering chamber 47 of filter unit 19.

Thus, the delivery pressure by the pump unit 14 is applied to the interior of the filtering chamber 47. The water to be filtered will be urged to flow uniform through all the portions or regions of the filter elements 48 and 49. Dirt, scum and sludge will be caught by the filter elements while the water is advancing downwards through said elements, so that the clean refreshed water is discharged through the drainage apertures 53 of the bottom cover 46.

The clean water effluent from the lower end of the chamber 47 will stay within the housing 11 until its level reaches the height of the overflow weir 24. Subsequently, the water returns to the tank 20 through the return canal 23.

If and when the filter elements 48 and 49 have been clogged with the suspended dirt or the like in the water and are judged to be no more effective to filter the tank water, the end of the flexible pipe 50 is removed from the outlet port 30 of the pump unit 14 in order to replace the clogged filter unit 19 in its entirety with a new one.

As described above, no dead or inoperative zones take place in the filter elements 48 and 49 of the filter apparatus according to the invention, because the tank water compressed by and delivered from the pump unit 14 is forced through those filter elements. In other words, a kind of filter press is provided by the invention so that the tank water penetrates uniform all the zones of said filter elements. This feature is advantageous in that the delimited quantity of the filter elements in the filtering chamber 47 can fully perform their function to realize a maximum efficiency. Thus, any uneven and early clogging of said elements is prevented herein to prolong the life thereof.

Further, the upper and lower filter elements 48 and the middle element 49 sandwiched in between them are accommodated tightly in the filtering chamber 47, in a packaged form. Therefore those elements, especially the middle one, can be selected from any granular, flocculent or other types of filter materials as far as they are so efficient that the size of the filter unit 19 is not enlarged but rendered more compact. This filter unit is designed such that it can be replaced as a whole with a new one by taking off the flexible pipe 50 away from the outlet port 30 of the pump unit 14. Thus, maintenance work of this filter apparatus is carried out easily when its filter elements have been clogged to lower their efficiency of filtration.

What is claimed is:

1. A filter apparatus for use with a water tank, the apparatus comprising:
    an outer housing attachable to a peripheral wall of the walter tank and having a return canal for returning the filtered water into the water tank, said housing having a bottom;
    a pump unit having a suction pipe which extends into and pumps up the water present in the tank, said pump unit having an outlet point; and
    a filter unit received within the outer housing, and comprising:
    (a) a receptacle container having an open bottom and a closed top with a flexible bellows pipe integral with said top of the receptacle;
    (b) a bottom cover fitted in the open bottom of the receptacle so as to form a filtering chamber and said bottom cover having a plurality of drainage apertures;
    (c) filter elements disposed in the filtering chamber; and
    (d) a free end of the flexible pipe connected to said outlet port of the pump unit.

2. A filter apparatus as defined in claim 1, wherein the outer housing has at an upper end of its periphery a hook portion which engages with an upper end of the peripheral wall of the water tank so as to hang from the housing on the water tank.

3. A filter apparatus as defined in claim 1, wherein the bottom cover of the filter unit has at least one leg so that a spaced distance is provided between the bottom cover and the bottom of the housing.

4. A filter apparatus as defined in claim 1, wherein said filter elements comprise
    an upper filter element adjacent to the top of the receptacle container within said container;
    a lower filter element adjacent to the bottom cover of said filtering chamber; and
    a middle filter element sandwiched between said upper and lower filter elements.

5. A filter apparatus as defined in claim 5, wherein the upper and lower filter elements are each a plate of an open-cell foam; and
    wherein the middle filter element is a granular aggregation of activated carbon.

* * * * *